United States Patent [19]

McBride et al.

[11] Patent Number: 5,042,761
[45] Date of Patent: Aug. 27, 1991

[54] KEYBOARD BRACKET

[76] Inventors: Donald J. McBride; Yuen F. M. Kou, both of 182 Boston Rock Rd., Melrose, Mass. 02176

[21] Appl. No.: 501,949

[22] Filed: Mar. 30, 1990

[51] Int. Cl.[5] ............................................. A45D 19/04
[52] U.S. Cl. .................................... 248/175; 206/305; 248/918
[58] Field of Search ............... 248/175, 442, 674, 676, 248/205.1, 918, 917; 312/208; 206/305

[56] References Cited

U.S. PATENT DOCUMENTS

| 4,546,947 | 10/1985 | Gesten | 248/918 X |
| 4,568,056 | 2/1986 | Lewinski | 248/918 X |
| 4,767,093 | 8/1988 | Jones | 248/442.2 |
| 4,832,191 | 5/1989 | Gerver et al. | 206/305 X |
| 4,844,387 | 7/1989 | Sorgi et al. | |

FOREIGN PATENT DOCUMENTS

| 1253610 | 7/1988 | Canada . |
| 3607114 | 10/1987 | Fed. Rep. of Germany . |
| 3744703 | 1/1989 | Fed. Rep. of Germany . |

Primary Examiner—Ramon O. Ramirez
Attorney, Agent, or Firm—Robert L. Goldberg

[57] ABSTRACT

The disclosed invention relates to a support structure for mounting a keyboard on top of a monitor. When mounted on top of the monitor, the invention provides a near horizontal, flat platform for support of a keyboard. The support structure holds the keyboard securely and utilizes no additional work space.

9 Claims, 2 Drawing Sheets

KEYBOARD BRACKET

BACKGROUND OF THE INVENTION

1. Introduction

This invention relates to a structure for supporting a computer keyboard on top of a computer monitor.

2. Discussion of Prior Art

A keyboard, central processing unit, and monitor are usually the minimum hardware required for operation of a computer. These devices sometimes occupy considerable amounts of usable desk space even when the computer is not in use. In order to gain more desk space on a crowded desk top, many users place the keyboard on the floor or lean it sideways against some heavy object while the computer is not being used. This practice subjects the keyboard to the possibility of unnecessary damage.

As computers become standard office equipment, more and more furniture manufacturers design special computer furniture. Most of the furniture is designed as a separate desk to accommodate the extra computer equipment. Some computer furniture has drawers which can be retracted to hide the keyboard under the desk. These types of furniture designs require excessive monetary outlays when equipping an office. Extra office space is often needed to accommodate this type furniture.

The "keyboard-in-a-drawer" approach also places the keyboard in an awkward position for the typist and eliminates the usual desk center drawer used for storage of miscellaneous stationery items.

Some computer accessory manufacturers market a monitor stand with a drawer in which a keyboard can be stored. The user slides the keyboard into the monitor stand opening while the computer is not in use. The monitor stand opening has to be able to house keyboards of all sizes and must be constructed in a way to support the weight of the monitor and the CPU chassis. Hence, the monitor stand is generally bulky and defeats the original purpose of the "space-saving" device.

German Pat. No. DE 36067 114 A1 discloses a movable apparatus useful for holding a monitor and keyboard. The apparatus features a movable platform which swings out to move both the monitor and keyboard out of the way.

German Pat. No. DE 37 44703 Al discloses a platform type stand where the computer monitor sits on the platform and the lower attached portion holds the keyboard. This lower platform is capable of being lowered and pushed up or down away from the top platform.

Canadian Pat. No. 1 253 610 discloses an accessory for computers relating to mounting the keyboard on top of the monitor. The accessory consists of arms with fingers to hold the keyboard in an upright position. The arms are attached to both sides of the monitor using double sided tape. This type of arrangement is not stable and the taped arms may loosen after repeated use.

U S. Pat. No. 4,844,387 discloses an adjustable arm apparatus for holding a monitor and keyboard. The apparatus is mounted to the desk and has a swivel mount to enable the user to swing both the monitor and keyboard to different locations. This type apparatus must be physically located on the corner of a desk in order to effectively free up desk work space.

SUMMARY OF THE INVENTION

It is the purpose of this invention to provide a structure for supporting the keyboard on top of the monitor to thus avoid crowding the desktop or other surface on which the computer is placed.

The invention as herein described is in the form of a support structure for mounting the keyboard on top of the monitor. The invention utilizes a computer monitor as a base for supporting the keyboard bracket. When mounted on top of a computer monitor, the invention provides a near horizontal, flat platform on which a keyboard can be placed. This arrangement permits users to place the keyboard on top of the computer monitor securely while the computer is not in use. There is virtually no extra desk space required other than the area for the computer monitor on which the invention is mounted.

DESCRIPTION OF THE PREFERRED EMBODIMENTS

Figure 1:
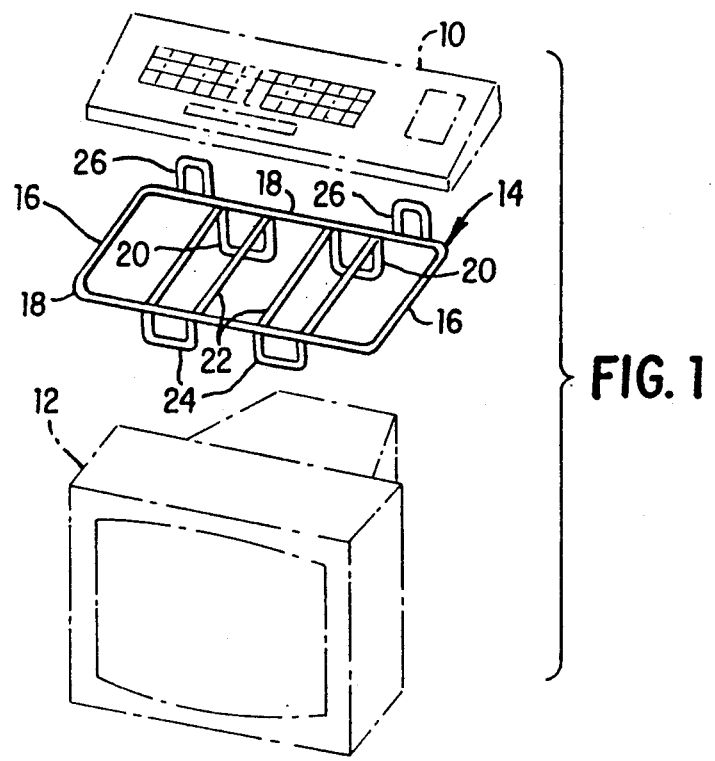
FIG. 1 is a perspective view of the keyboard, monitor, and supporting structure for mounting the keyboard on top of the monitor.

The invention may be constructed of any type rigid or semi-rigid plastic such as polypropylene, polyethylene or acrylic. Additional materials suitable include metals such as aluminum or steel. The structure may be in a one-piece molded form or connected by means of adhesive or spot welding in the case of a metal support.

The support structure for mounting the computer keyboard atop the monitor comprises an open platform with dimensions to accommodate the computer keyboard and an adaptor structure to support the platform on the monitor. The platform is desirably rectangular and supported by the adaptor structure. The adaptor structure comprises a pair of transversely-spaced legs extending downwardly from the plane of the platform at the forward edge of such length as to overhang the front of the monitor and a pair of transversely-spaced legs extending downwardly from the plane of the platform at the rear edge of such length as to rest on the rear portion of the monitor housing, said legs being so dimensioned as to support the platform horizontally for receiving the keyboard.

The legs at the rear edge are longer than the legs at the forward edge. Further the legs at the rear edge are transversely spaced at a distance corresponding to the width of rear portion of the monitor housing.

Specifically, the invention is comprised of two major functional structures. The first structure is the "platform" which is a flat surface on which the keyboard is placed. The second structure is the "adaptor" which conforms to the contour of a typical computer monitor to create a near horizontal and stable support for the platform.

The platform is a framed rectangular plane with two flaps on one of the two long edges of the rectangle. When placed on top of the computer monitor, the long axis of the rectangle is parallel to the monitor's screen. The plane created by the rectangle is near horizontal when mounted on top of a computer monitor. The edge with the two flaps is the farthest edge away from the monitor's screen. The flaps are perpendicular to the rectangular plane pointing upward. When observed from the side, the flaps form an "L" with the plane. The keyboard is placed on the platform with its long axis parallel to the monitor's screen and the flaps prevent the keyboard from sliding backward off of the platform.

The adaptor is comprised of two long and slender rectangular frames. Each adaptor frame has both ends of the long axis bent downward so that the profile looking from the side of the adaptor resembles an inverted "U" with a long cross member between two legs on each end. The rear legs are longer than the front legs and may be as much as five times longer or greater.

It is also possible to make the rear legs adjustable. This may be accomplished by a variety of means. The legs may be constructed of wire form having a series of jagged half circle loops at equal intervals. The user can then adjust the length of the legs by moving the legs up or down and anchoring to one of the loops at the correct height. The legs may also be adjustable by having the rear legs hinged such that the height of the legs is adjusted by changing the angle of the hinge.

When placed on top of the computer monitor, the short legs are directed to the front of the monitor and the long legs are directed to the rear of the monitor. The short legs of the adapter overhang the front of the computer monitor so that the tips of the short legs actually drop below the top of the monitor allowing the front portion of the adaptor cross member to rest on top of the monitor The short legs prevent the invention from sliding backward off the top of the monitor due to the backward sloping lateral profile of most computer monitors. The short legs can be eliminated by use of a strip of double-sided tape or VELCRO cloth fastening tape applied to the underside of the platform's front portion 30 and the top of the monitor 32 prior to positioning the support structure on top of the monitor. The long legs rest on top of the rear portion of the monitor housing to provide stable support for the invention. Additionally, double-sided tape or VELCRO cloth fastening tape may be applied to the long legs at the rear portion of the monitor to increase stability.

The invention will be further understood by reference to the drawings FIG. 1 shows in perspective a keyboard 10, a monitor 12, and a structure 14 for supporting the keyboard atop the monitor. The structure 14 comprises a rectangular frame embodying spaced parallel rigid members 16—16, spaced parallel rigid members 18—18 and legs 20—20 for mounting the frame atop the monitor. The legs 20—20 are transversely spaced and each leg comprises spaced parallel lengths of rigid members 22—22 connected to the rigid members 18—18.

The rigid members 22—22 are connected at one end to one of the longitudinal members and at the other end extend forwardly of the other longitudinal member The rigid members 22—22 that extend forwardly terminate downwardly to form legs 24—24 which mount against the face of the monitor. Additionally, to prevent the keyboard from sliding rearily, transversely spaced upwardly turned legs 26—26 are provided on the rear one of the transverse wires 18—18 for engagement with the rear edge of the keyboard.

Figure 2:
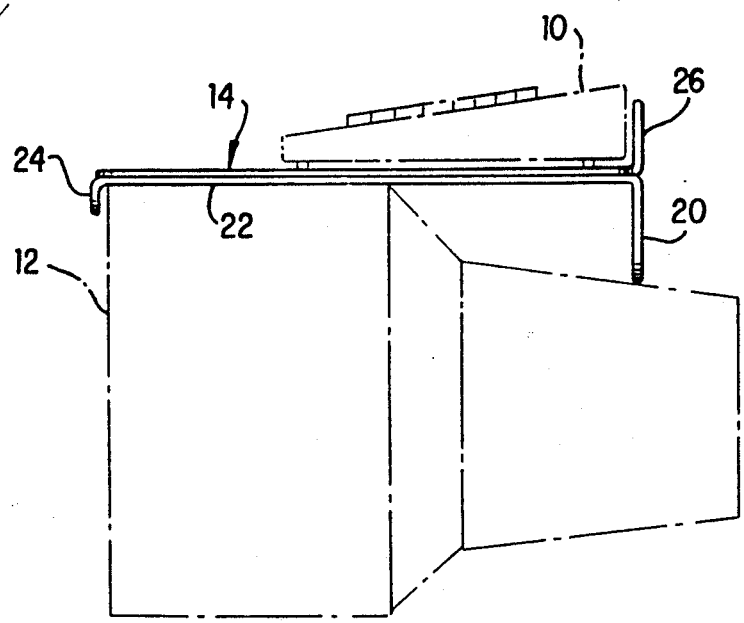
FIG. 2 is an elevation of the support structure.

FIG. 2 shows an elevation of the support structure 14 in its contemplated use. As disclosed, on the monitor 12 the rigid members 22—22 rest on the top of the monitor, the legs 24—24 engage the front face of the monitor housing and the legs 20—20 engage the top of the rear portion of the monitor housing. The keyboard 10 rests on top of the platform structure and is prevented from sliding off by upwardly turned legs 26—26 at the rear of the platform.

Figure 3:
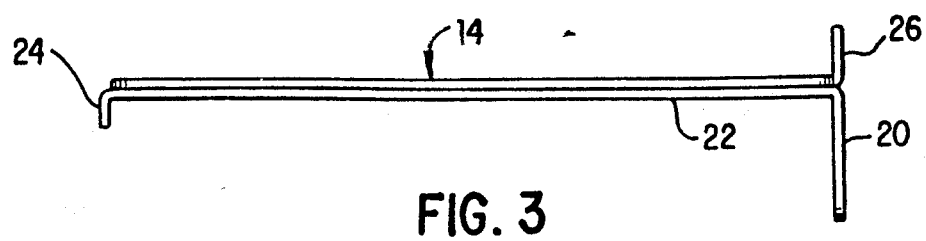
FIG. 3 is a plan view of the support structure.
Figure 1A:
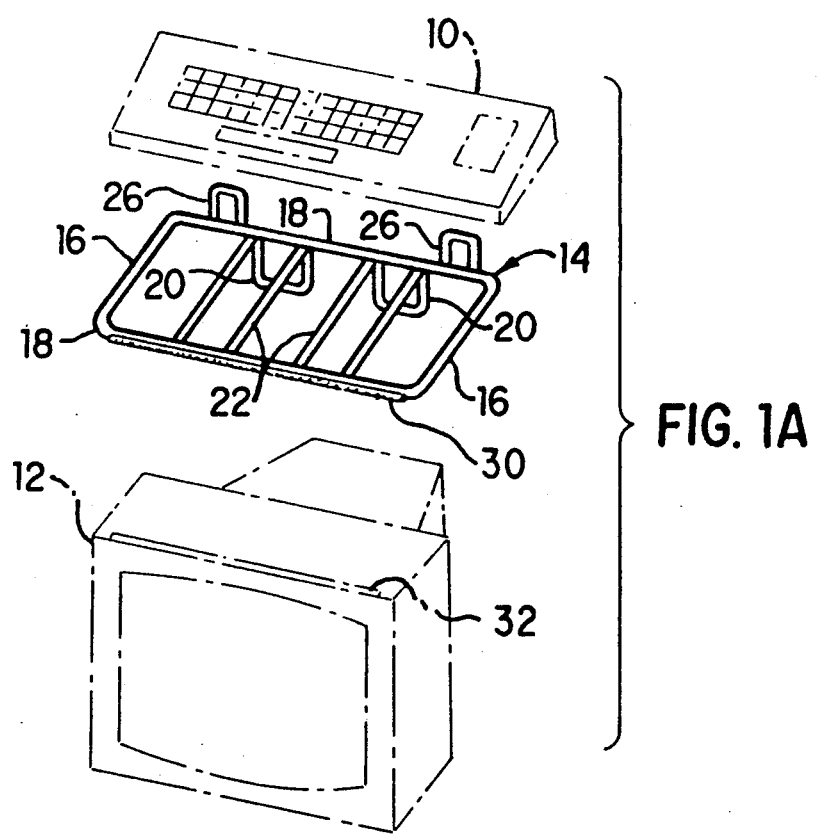
FIG. 1a is an alternate embodiment of FIG. 1.

FIG. 3 shows a plan view of the support structure with front legs 24—24, rear legs 20—20 and upwardly turned legs 26—26 to prevent the keyboard from sliding off the support structure.

The above descriptions are mere examples of variations contemplated in the practice of the invention and are not to be taken as limitations of such. It is further contemplated that the support structure may be made by incorporating the adaptor and platform members into the molded monitor housing, thereby forming one continuous structure.

What is claimed is:

1. A support structure for mounting a computer keyboard on top of a computer monitor housing comprising an open platform dimensioned to accommodate said keyboard, and an adaptor structure to support said platform on said monitor wherein said adaptor structure further comprises a pair of transversely-spaced legs extending downwardly from the plane of the platform at the forward edge of such length as to overhang and rest on the front of the monitor housing; upstanding legs at the rear edge of the platform so dimensioned as to prevent the computer keyboard from sliding off the platform; and a pair of transversely spaced legs extending downwardly from the plane of the platform at the rear edge of such length as to rest on the rear portion of the monitor housing, said legs being so dimensioned as to support the platform horizontally for receiving the keyboard.

2. A support structure according to claim 1 wherein said legs at the rear edge are longer than the legs at the forward edge.

3. A support structure according to claim 1 wherein said forward legs are replaced by strips of double-sided tape or VELCRO cloth adhesive applied to the underside of the platform's front edge and the top of the monitor.

4. A support structure according to claim 1 wherein said adaptor and platform are incorporated into the molded monitor housing, thereby forming one continuous structure.

5. The structure of claim 1 in combination with a computer monitor.

6. The structure of claim 5 further in combination with a keyboard.

7. A support structure for mounting a computer keyboard on top of a computer monitor housing comprising an open platform dimensioned to accommodate said keyboard, and an adaptor structure to support said platform on said monitor wherein said adaptor structure further comprises a pair of transversely-spaced legs extending downwardly from the plane of the platform at the forward edge of such length as to overhang the front of the monitor housing and rest on a perpendicular surface, said legs being so dimensioned as to support the platform horizontally for receiving the keyboard; and a pair of transversely-spaced legs extending downwardly from the plane of the platform at the rear edge of such length as to rest on a perpendicular surface, said legs being so dimensioned as to support the platform horizontally for receiving the keyboard.

8. The structure of claim 7 in combination with a computer monitor.

9. The structure of claim 8 further in combination with a keyboard.

* * * * *